United States Patent [19]
Brandt et al.

[11] Patent Number: 5,458,714
[45] Date of Patent: Oct. 17, 1995

[54] CONTAINER LABEL AND SYSTEM FOR APPLYING SAME

[75] Inventors: Thomas L. Brandt, Windsor; Daniel N. Willkens, Elmira, both of N.Y.

[73] Assignee: Brandt Manufacturing Systems, Inc., Deposit, N.Y.

[21] Appl. No.: 126,743

[22] Filed: Sep. 27, 1993

Related U.S. Application Data

[63] Continuation of Ser. No. 873,334, Apr. 20, 1992, abandoned, which is a continuation of Ser. No. 432,442, Nov. 6, 1989, abandoned, which is a continuation-in-part of Ser. No. 267,877, Nov. 7, 1988, abandoned.

[51] Int. Cl.⁶ .................................................... B32B 31/00
[52] U.S. Cl. ................ 156/237; 156/238; 156/240; 156/277; 156/321; 156/280; 156/275.5
[58] Field of Search ........................ 156/321, 237, 156/238, 240, 277, 280, 275.5, 247, 239, 241, 230, 272.2, DIG. 12, 542, 556, 456, 457, 458, 558, 559, 541, 552, 361

[56] References Cited

U.S. PATENT DOCUMENTS

| | | | |
|---|---|---|---|
| 3,630,797 | 12/1971 | Mallory | 156/321 |
| 3,652,362 | 3/1972 | Odagiri | 156/321 |
| 3,905,854 | 9/1975 | Kaercher et al. | 156/321 |
| 3,922,435 | 11/1975 | Asnes . | |
| 4,024,011 | 5/1977 | Crankshaw et al. | 156/542 |
| 4,028,165 | 6/1977 | Rosenfeld | 156/234 |
| 4,053,666 | 10/1977 | Taylor et al. | 215/DIG. 12 X |
| 4,065,589 | 12/1977 | Lenard et al. | 215/DIG. 12 X |
| 4,219,596 | 8/1980 | Takemoto et al. | 156/238 X |
| 4,287,016 | 9/1981 | Kerwin | 156/542 |
| 4,292,103 | 9/1981 | Namura et al. | 156/237 X |
| 4,324,608 | 4/1982 | Klinger | 156/542 |
| 4,369,082 | 1/1983 | Kerwin | 156/542 X |
| 4,452,659 | 6/1984 | Geurtsen et al. | 156/361 |
| 4,482,598 | 11/1984 | Ishii et al. | 156/277 X |
| 4,741,791 | 5/1988 | Howard | 156/237 X |
| 4,801,853 | 1/1989 | Lewis et al. | 242/203 |
| 4,909,888 | 3/1990 | Kobayashi | 156/567 X |

FOREIGN PATENT DOCUMENTS

| | | |
|---|---|---|
| 2424329 | 12/1974 | Germany . |
| 2744515 | 4/1979 | Germany . |
| 52-21939 | 6/1977 | Japan . |
| 57-87397 | 5/1982 | Japan .................. 156/237 |
| 62-275751 | 11/1987 | Japan . |

OTHER PUBLICATIONS

International Search Report PCT/US89/04888–Feb. 6, 1990.

*Primary Examiner*—Chester T. Barry
*Attorney, Agent, or Firm*—Sughrue, Mion, Zinn, Macpeak & Seas

[57] ABSTRACT

A label for a glass container is preprinted with inks and adhesive on a separable substrate and cured, and the printed label is then transferred to the container. The labelled container is then coated with a protective material. The label application apparatus includes a mechanism for indexing the label web in such a manner as to minimize starting and stopping of the supply and take-up reels when labels are applied to plural containers simultaneously.

15 Claims, 7 Drawing Sheets

*FIG. 1 HEAT TRANSFER LABEL*

CONTAINER LABEL AND SYSTEM FOR APPLYING SAME

REFERENCE TO RELATED APPLICATIONS

This application is a continuation of application Ser. No. 07/873,334 filed on Apr. 20, 1992, abandoned, which is a continuation of Ser. No. 07/432,442 filed Nov. 6, 1989, abandoned, which is a continuation-in-part of Ser. No. 07/267,877 filed Nov. 7, 1988, now abandoned, of Thomas L. Brandt and Daniel N. Willkens entitled "Container Label and System for Applying Same" related to concurrently filed applications having attorney docket numbers A-5635, A-5636 and A-5637, corresponding to Ser. No. 07/431,968, Ser. No. 07/432,441, and Ser. No. 07/431,967, now U.S. Pat. No. 5,366,251, respectively, the disclosures of said applications being incorporated by reference herein.

BACKGROUND OF THE INVENTION

The present invention is directed to a technique for labeling containers, and more particularly to a technique for applying decorative and/or informational labels to glass containers. Still more particularly, the invention is directed to a technique for fabricating a label composite which applies only the inks for the graphics, a method for applying the label inks to the container and a method to coat the entire container including the label to protect the inks and improve the physical characteristics and appearance of the container.

Glass containers are currently labeled in three different ways. The predominant method is printed paper labels glued to the container at the time of filling and sealing. Such labels offer almost unlimited art potential and are commonly used on food, and both returnable and non-returnable beverage containers. This is the lowest cost technique, but offers little resistance to label damage from handling and exposure to moisture or water, and may not survive the washing procedures required of a returnable container, thereby requiring re-labeling.

A second, and more recently developed, container labeling technique is that of applying a thin styrofoam label to cover the container from shoulder to heel, with the decorative and/or informational material being printed on a more dense outer skin of the styrofoam label. This is widely used on lighter-weight one-way bottles common in the beverage industry. It offers some impact resistance and a large surface area for printing product information and instructions, as well as company logos. It is, however, more costly than the paper label, has little durability, becomes easily soiled, and will not survive the alkali washing of a returnable beverage container, or the pasteurization required by some beverage containers. Also, because the printing surface is relatively rough, high definition printing is not possible.

A third container labeling technique is that of printing ceramic ink directly on the container surface using a screen printing technology. While the label appearance is generally good, the technique is typically limited to two or three colors due to cost considerations. A recent development is the preprinting of a ceramic ink decal which is then transferred to the glass container surface. This permits high definition printing and offers greater opportunities for color and art variety. Fired ceramic inks are extremely durable and will survive the alkali washing processes required of a returnable container.

However, both the direct printing ceramic ink and ceramic ink decal techniques require subsequent high temperature firing to fuse the ink to the glass substrate. In addition, while the preprinted ceramic ink label reduces the technical problems somewhat, both techniques require extreme attention to detail, a high level of maintenance and are run off-line at slow speed, with high labor costs. Due to the high cost, ceramic inks are the least commonly used labeling technique.

It is common practice in the glass container industry to treat the outer surface of the containers with materials to counteract the effects of high glass-to-glass friction experienced on freshly manufactured glass products. Glass containers are conveyed with a great deal of glass-to-glass contact and at times considerable line pressure. Without treatment there is considerable visible scratching which may result in breakage. It is common to surface treat at two locations in the operation. Immediately after forming and before lehring, the containers pass through a vapor which leaves a tin oxide film bonded to the surface. After lehring the containers are sprayed with a dilute water solution of a material which after evaporation of the water leaves a film to provide surface lubricity. Of the two treatments the tin oxide film is most costly, both for materials and system maintenance. The lubricity of the second film, though needed to prevent surface damage, may cause problems in subsequent labeling of the container.

There is an ongoing program in the container industry to reduce the weight of the container by reducing wall thickness, but still maintain acceptable product strength for both the internal pressures of carbonated beverages and the impact strength to survive handling damage in the filling operations, in the market place and by the consumer. The benefits of reduced weight are economic: lower glass melting fuel and material costs, higher container manufacturing speeds (lower cost) and reduced product shipping costs.

SUMMARY OF THE INVENTION

It is an object of the present invention, with certain variations, to overcome the above-described disadvantages of prior art labeling techniques and to offer solutions to the above-described container industry problems.

More particularly, it is an object of this invention to provide a label which is durable, highly impact resistant and yet permits high definition label printing.

It is a further object of this invention to provide an efficient labeling-equipment system for applying the improved label in line with the container manufacturing process, e.g., at line speeds of 400 containers a minute and above.

These and other objects are achieved according to the present invention by a labeling system wherein a removable backing layer is reverse printed with, e.g., a vinyl, or acrylic ink which is then cured and the printed ink overprinted with adhesive. The label is then applied to the container with its adhesive surface in contact with the container, and the backing layer is separated from the label, e.g., by the application of heat, while concurrently the ink bonds to the container. The labeled container is then applied with a suitable coating, which is then cured. The printing process provides the desired high definition printing capability, and the coating provides the required degree of impact resistance and durability.

It is a further object of the invention to eliminate the cost of tin oxide coating. Because the coating provides impact resistance and durability, it is no longer necessary to provide the tin oxide film prior to container lehring. Instead, a token amount of lubricating film is applied after annealing. This is preferably a film compatible with the adhesion materials on the label inks and with the coating, although it could alternatively be a film readily removed by oxidizing flame treatment prior to labeling. This lubricating film is sufficient to enable damage-free conveying from the lehr, through the inspection stations and into the labeling machine staging area.

Yet another object of this invention is to foster continued further reduction in container weight. It has been demonstrated that a container entirely coated with a nominal 0.6 mil of the coating will survive a 30–40% increase in fracture impact over an uncoated container.

It is also well known that considerable glass surface damage occurs throughout the container handling cycle including bulk and case packing at the container manufacturer. At the container filling operations the handling surface damage is severe also. Because the coating provides a much greater degree of surface protection, container failure from surface damage would be greatly reduced. The applied layer of coating is complete over the entire container surface including the label, without voids or discontinuities. Further reductions in wall thickness without compromising container strength are therefore possible. These reductions have value in increasing container manufacturing speeds, reducing fuel usage and material costs as well as reducing transportation costs.

The invention also provides a system for applying the above-described label in an efficient manner so that it can be performed on-line. The efficiency is in part due to a novel label web indexing mechanism including a movable shuttle roller and alternating braking mechanisms at the supply and take-up ends. This is especially advantageous when simultaneously applying labels to a plurality of containers. The collection of the used web on a take-up reel permits re-use of the web for further cost savings. It is also possible to modify existing commercial container labeling systems to accomplish the label application, in which case the heat necessary for ink release and adhesive activation can be provided by heating the container to a temperature of 200° F. prior to entering the labeling machine.

BRIEF DESCRIPTION OF THE DRAWINGS

The invention will be more clearly understood from the following description in conjunction with the accompanying drawings, wherein.

DETAILED DESCRIPTION OF THE INVENTION

Figure 1:
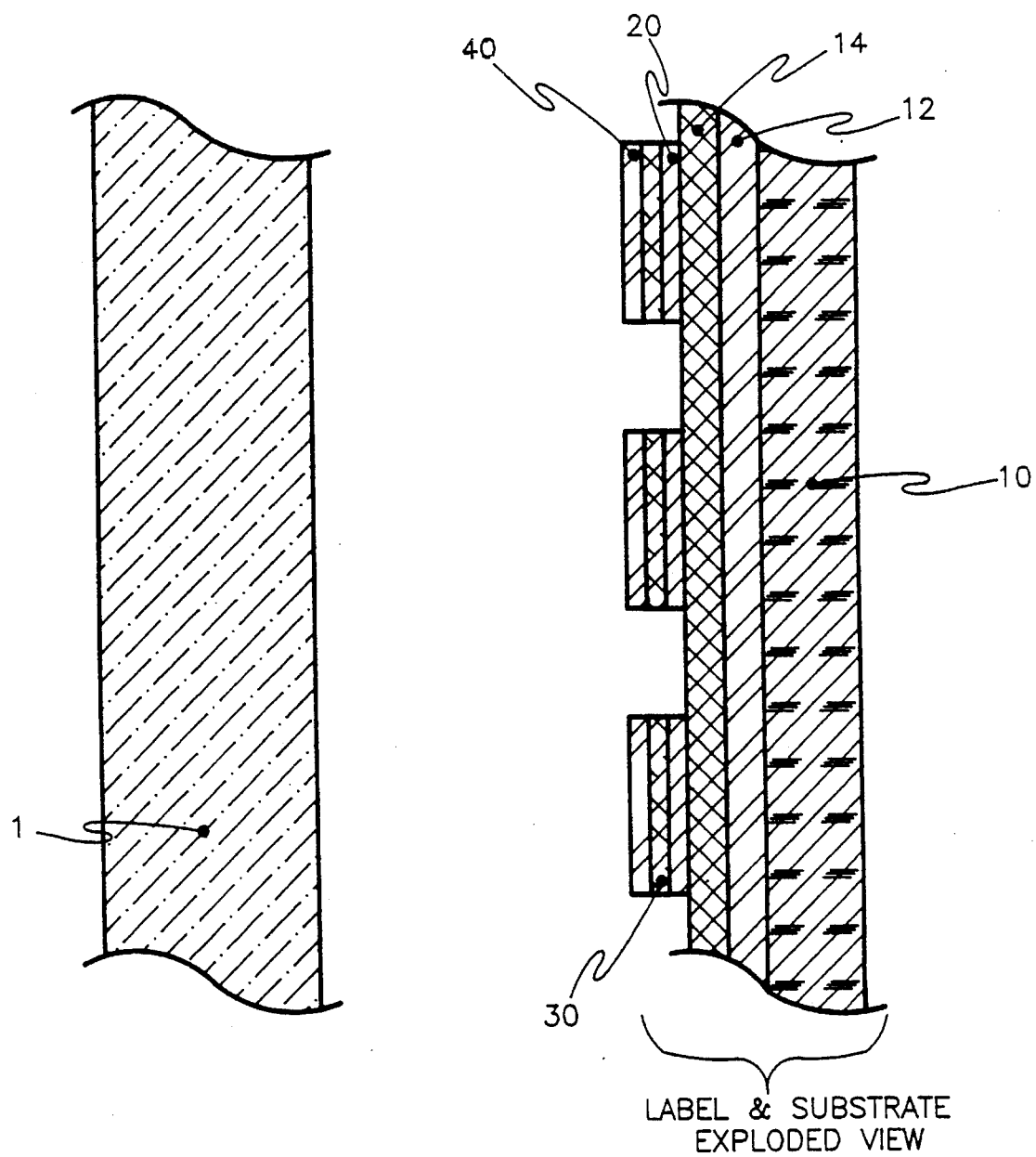
FIG. 1 illustrates all of the materials and their order of layering in accordance with a preferred embodiment of the present invention.

The preferred embodiment of the label and application system according to the present invention will be described first with reference to FIG. 1, which shows the glass container 1 and the label and substrate before application of the label to the container. The label fabrication begins with a backing layer 10 of a suitable material, e.g., a polypropylene film, which may be provided with an acrylic coating 12 to provide a high gloss surface. The backing layer 10, either with or without the acrylic coating 12, is preferably then coated on the side to be ink printed with a release material 14 activatable by heat. The desired label is then printed on this coated backing layer 10 with a suitable ink, preferably vinyl or acrylic ink 20. After application of the ink to the backing material 10, the ink 20 is then cured, e.g., by heat or by electron beam or U-V energy. After curing of the ink, a transparent bonding layer 30 is applied, preferably by printing only over the ink pattern, and this is then covered with an adhesive layer 40 printed over the bonding layer 30. All of these operations are accomplished in one pass through a multiple station gravure printer. The film-ink-adhesive laminate is then rolled up and forwarded to the container labeling system.

The application of the label to a container will now be described with reference to FIG. 2. For convenience, the description herein will be in the context of glass bottles, although it should be recognized that the labelling technique is applicable to all types of containers.

The bottles will be conveyed from the forming machine through an annealing lehr. The application of tin oxide before lehring is not necessary, nor would it serve any useful purpose with the new system. The bottles will then typically have been sprayed with a lubricant, and according to this invention it must be a lubricant which is compatible with the printed adhesives and coating, or which can be sufficiently removed to permit the subsequent labelling. A suitable lubricant would be ammonium stearate applied in a one-half percent (½%) water solution.

The bottles will then normally be subjected to a number of inspection criteria which are well known in the industry.

In any event, the bottles are received along a conveyor 100 from an inspection area. A typical system may provide bottles at a rate of 400 per minute, and it would be preferable according to this invention to divide this into two streams of 200 per minute each. For convenience, only one container stream is shown, it being understood that the remaining one or more container streams would be processed in the same manner. In each stream, as shown in FIG. 2, the bottles are passed one-at-a-time by a star wheel control device 102 to a loading station 104. The bottles are then moved downwardly in FIG. 2 onto an indexing table 106 by means of a suitable placement device. The indexing table 106 will include container holders, e.g., suction holders or the like, which are arranged in groups of three, with each group of three being arranged rectilinearly. There may be supports at the neck of each container to absorb pressure during the container transfer.

Figure 2:
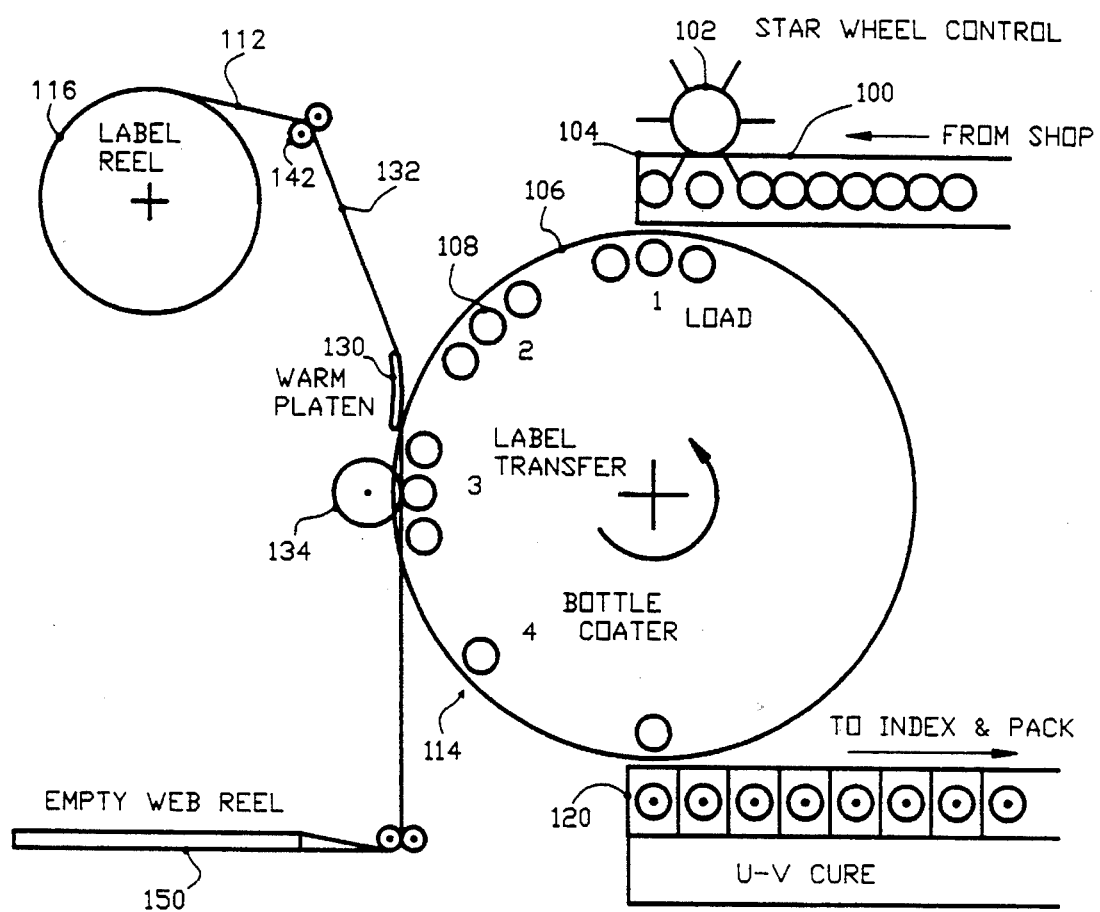
FIG. 2 is a schematic diagram of a system for applying the label of FIG. 1.

After loading three bottles onto the indexing table 106, the indexing table is then rotated counterclockwise in FIG. 2 from the loading station to a container orienting station generally designated at reference character 108. If desired or necessary for the particular type of container and label being used, the container may here be rotated to a particular orientation, although this will be unnecessary in many container labeling systems. The rotating of the container would preferably be performed by rotation of individual container holder suction cups on the indexing table 106 until the correct position is detected, e.g., by suitable photoelectric means, at which point the holders would be locked in their correct positions. (If locked, they will have to be unlocked prior to the label application step, as the label application step requires rotation of the bottles as will be described in more detail below.)

If it is desirable to burn off residual lubricant, this can be done at station 108, in addition to proper orienting of the bottles, preferably by an oxidizing flame but alternatively by other means such as corona treatment.

After processing at station 108, the indexing table 106 is further rotated to bring the bottles to the label transfer station. At this point, the web 112, formed in the manner described with reference to FIG. 1, is juxtaposed with the three bottles with a respective label being adjacent each container. The vinyl or acrylic ink labels are then transferred to the bottles, in a manner which will be described in more detail below, and the indexing table is then rotated to a coating station 114 where a suitable protective coating is applied. A suitable coating material would be UV-curable or heat-curable acrylic, one example of which is a UV-curable acrylic identified as R796Z80, which is composed of film formers, resins, reactive diluents and additives and butyl acetate solvents, manufactured by PPG Industries, Inc. and available from Brandt Manufacturing Systems, Inc. However, any clear acrylic coating, as well as a number of other overcoat materials, could be used without departing from the spirit and scope of the invention.

The indexing table 106 is then further rotated to bring the labeled and coated bottles to an unloading station where each container is off-loaded onto a container conveyor. There are a number of ways in which the bottles could be removed. All bottles could be removed from the indexing table 106 to a single conveyor 120, taking care to ensure that the acrylic coatings are not disturbed. It may be necessary, with suitable care taken, to use an air knife. It may, however, be necessary to move the bottles by clamping them at their neck and carrying them onto the conveyor 120 in a known manner.

It is also to be remembered that the bottles are held in groups of three on the indexing table 106. In the interest of speed, it would be possible to arrange three separate conveyors 120 each for receiving one of the three bottles in each group from the indexing table 106.

Once on the conveyor 120, the acrylic coating on the bottles is cured in a suitable manner, e.g., by heat or U-V energy. For speed in the case of U-V curing, it would be desirable to position U-V lamps on either side of each container. If desirable, it would also be possible to rotate each container by 90° during the curing process to provide full coverage of the container by the opposing lamps. After the curing process, the conveyor 120 carries the bottles to a further container inspection area (if desired) and thence to a packing or filling station.

The handling of the label during application of that label to the container in the system of FIG. 2 will now be discussed in more detail. As will be recalled from the discussion earlier herein, the label has been fabricated in the form of a film-ink-adhesive laminate which has been rolled up. The web will preferably have a leader and a tail area for continuous feed through the application equipment when the leader and tail pieces of successive laminates are connected.

The laminate is held on a supply reel 116. The adhesive has been permitted to cure to a point at which it is no longer tacky, thus permitting the label to be rolled up and subsequently unrolled. Prior to application of the label to the container, the adhesive may have to be activated, and this may be done by applying heat to the web 112 at some point prior to the warm platen 130, e.g., at the location designated by reference character 132. The heat could be applied by way of infra-red lamp array and would have to be sufficient to permit the adhesive to melt, e.g., on the order of 180° F. A preferred adhesive would be that disclosed in copending application no. A-5637 identified above. At bottle rates of on the order of 200 per minute, the heating of the bottles prior to the labelling station is sufficient that the adhesive is activated immediately upon contact with the bottle, and no preheating of the adhesive is necessary. At higher rates, e.g., 500 per minute, it may be that additional preheating of the adhesive will be needed.

Alternatively, the adhesive used may be of a type which does not require activation. In this case, it would merely be necessary to coat the substrate 10, on the surface thereof opposite the surface carrying the ink, with a suitable coating material to prevent adherence of the adhesive to the layer 10 when the label is rolled up onto the supply reel 116. Such coatings are well known in the art and need not be described in detail herein.

A still further option would be to omit the adhesive entirely in the process of fabrication of the label, and to apply the adhesive for the first time to the web 112 at the location 132, or to apply it to the container itself just prior to the labelling station.

Regardless of what type of adhesive is used and how it is activated, if at all, the labeling web will be passed across a warm platen 130 prior to the label transfer station. The purpose of this warm platen is to ensure that the temperature of the label laminate, and especially the release agent 14, is such as to permit easy separation of the backing layer 10 from the ink label. This typically requires a release temperature of approximately 200° F. with a few degrees tolerance on either side. A heated roll 134 is then used to press the label onto each container, and the backing layer 10 is then removed by a take-up reel 150.

The manner of handling the labeling web will be further described with reference to FIG. 3. As will be recalled, the indexing table 106 holds the bottles in groups of three, and it is desirable to handle the labeling web in such a manner as to permit application of labels to three bottles substantially simultaneously. It will also be recalled that, for a rate of approximately 200 bottles per minute for each indexing table, and with the bottles being handled in groups of three, the table is indexed a little less than once per second. Accounting for table travel time, this allows approximately ½ second for each label transfer. The present inventors have devised a novel and effective mechanism whereby, during this ½ second interval, the labelling web 112 in FIG. 2 is advanced past the bottles by an amount corresponding to two successive labels to make ready for labeling the next three bottles.

The label supply reel 116 and/or first capstan 142 are provided with brake mechanisms. Beginning with three unlabeled bottles at the label transfer station, it will first be noted that the bottles are preferably held in position such that their centers are separated from one another by a distance at equal to the linear distance between leading edges of successive labels. The label web is then advanced to a position such that the beginning of each of three different labels will be in contact with the circumference of a respective container. The web is then pulled past the bottles, with the bottles being rotated by the adhesion with the web. The preferred embodiment illustrated in FIG. 2 includes a separate heated roll 134 for each of the three containers in a group. In addition, the rolls may preferably be implemented in the form of inflated bladders to permit accommodation of minor surface irregularities.

During movement of the web past the bottles between label applications, the web and bottles must be out of contact with one another, while they must obviously be in contact during the application of the label. This will require either that the web be moved toward and away from the indexing table or that the bottles be movable radially with respect to the indexing table. The latter would be preferred.

Figure 3:
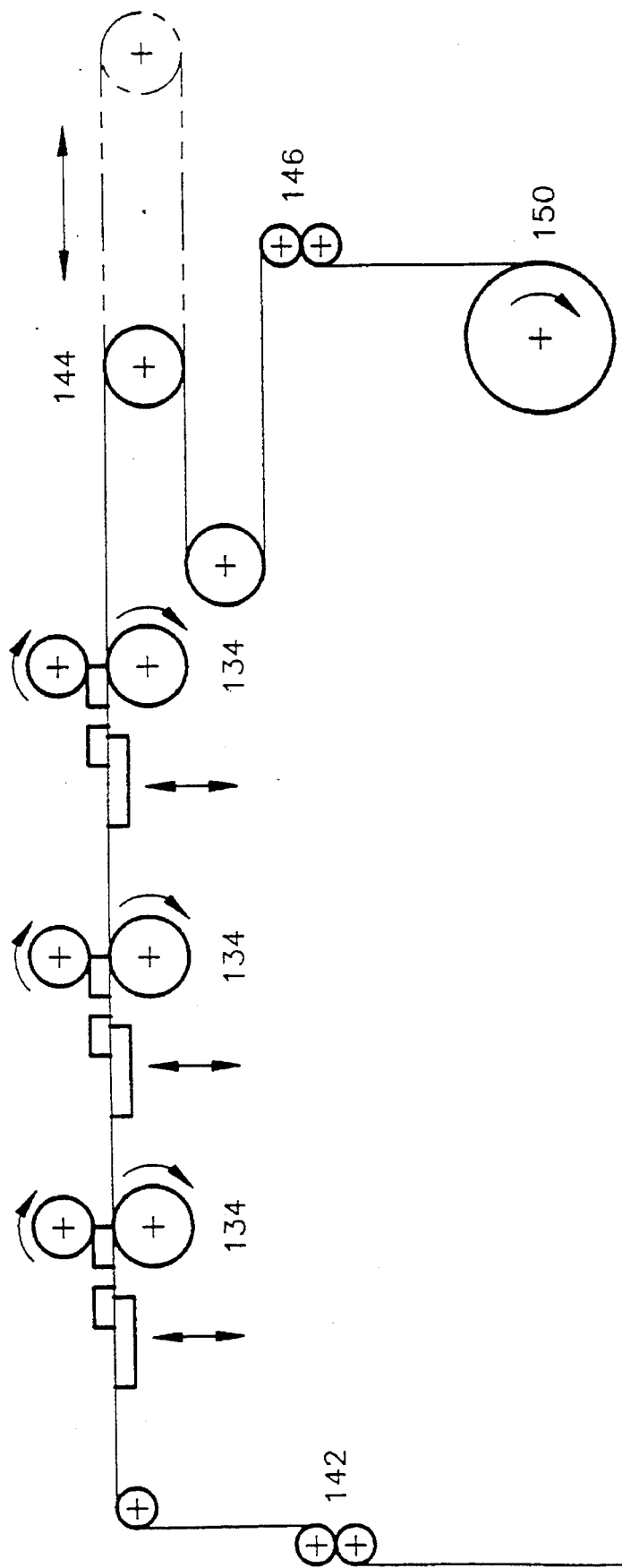
FIG. 3 is a diagram of a novel web indexing mechanism which may be used in the system of FIG. 2.

With reference to FIG. 3, the slow movement of the web past the bottles is accomplished, with the brakes on the supply reel 116 and capstan 142 in FIG. 2 disengaged, by moving the roller 144 in the rightward direction in FIG. 3 while a brake associated with capstan 146 or take-up reel 150 is engaged. The roller 144 is permitted to rotate freely during this rightward movement. As will be easily understood, movement of the web 112 through a distance L will be accomplished by moving the roller 144 through a distance L/2. Thus, the roller 144 is moved by a distance L equal to one-half the length of a label so that the labels may be completely applied, and then the roller 144 must continue its movement by an amount sufficient to move the used web beyond the labelling station until the leading edge of the next unused label is at the proper position for application to the container closest to the roller 144. After this movement of the roller 144 has been completed, the brake on the supply reel 116 or capstan 142 is applied while that on capstan 146 or take-up reel 150 is released. The roller 144 is quickly moved back to its leftward position in FIG. 3 while the take-up reel 150 takes up the slack.

The movement of the roller 144 to move out the used label web and the subsequent movement of the roller 144 back to the left in FIG. 3 may preferably be performed during rotation of the indexing table.

Figure 4:
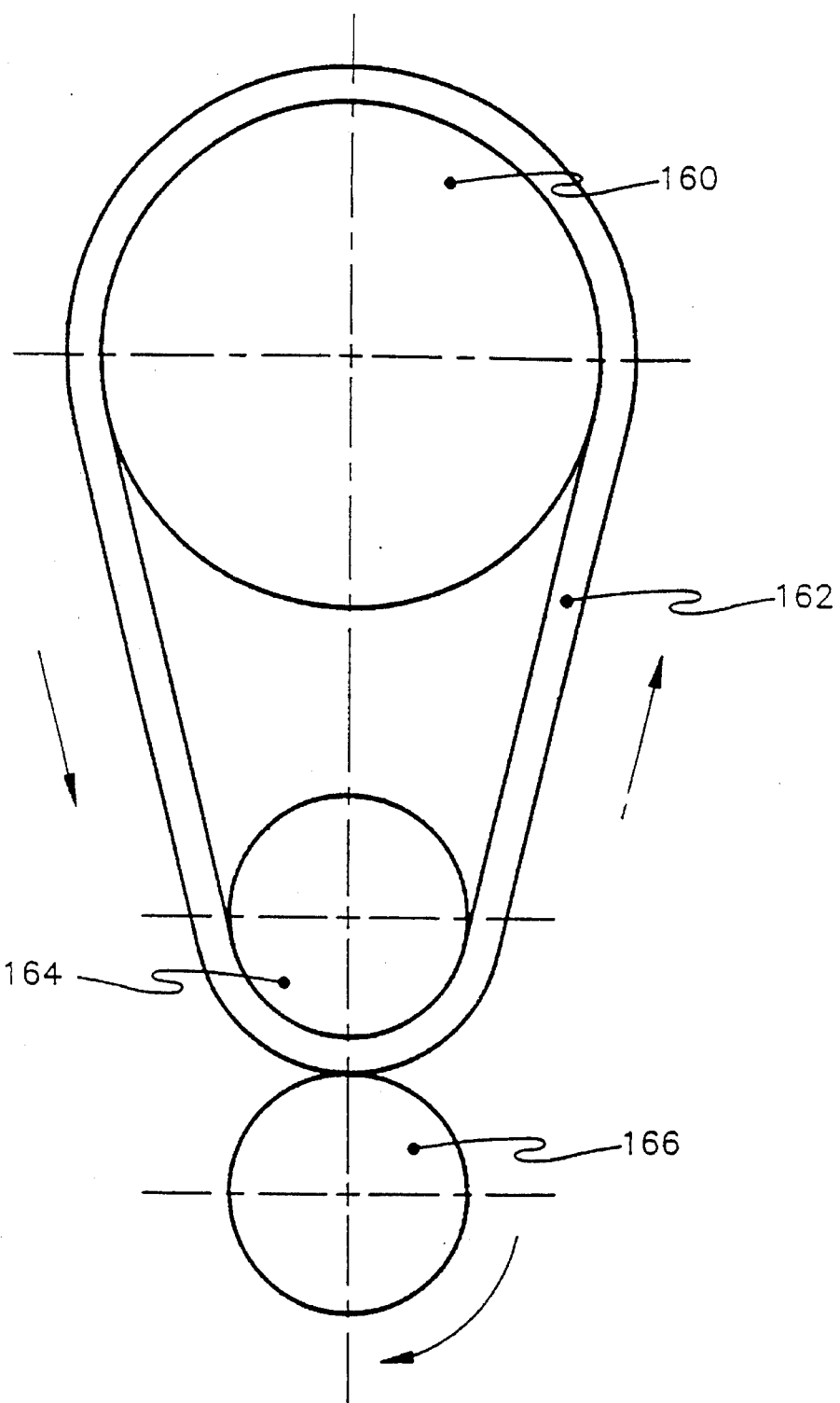
FIG. 4 is a diagram for explaining a suitable mechanism for applying the overcoat layer in the system of FIG. 2.

FIG. 4 provides a brief diagram for explaining one technique for applying the protective coating at station 114 in FIG. 2. A drum 160 having apertures in its periphery would provide the acrylic (e.g., urethane) coating solution to a sponge belt 162. A backing roller 164, or leading and trailing rollers if desired, would then press the sponge belt 162 against the periphery of the labelled container 166. The thickness of the applied coating could be controlled by controlling the rate at which the coating material is supplied by the drum 160 depending on bottle shape and area to be coated additional belt arrangements may be necessary and the flexible belt 162 will conform to the curve in the shoulder of the container. In addition, it would be possible to confine the application of coating solution to a specific region in the width direction of the belt 162, either by designing the length of the drum of by controlling the opening and closing of certain apertures at different axial positions of the drum. This would allow the application of a protective coating to certain portions of the container, or would indeed permit the thickness of the coating to vary over the length of the container, e.g., a 1 mil thickness over most of the container and only a 0.5 mil thickness over the label.

Depending on bottle shape and area to be coated, additional belt arrangements may be necessary.

While it is expected that the adhesion between the belt 162 and bottle 166 will be sufficient to rotate the bottle during the coating process, it may nevertheless be desirable to actively rotate the bottle, e.g., by means of its holder on the indexing table.

A benefit of the coating material is that it adds to the strength of the container, and may therefore permit fabrication of thinner bottles while still meeting industry standards for strength and durability. The durability could be further enhanced by adding microspheres to the coating material, such as those available from Potter's Industries.

An additional benefit of the coating layer is that it will tend to fill in any scratches or other similar surface defects in the container, thereby substantially improving the appearance of the container.

It may be that prior to the processing shown in FIG. 2 the bottles will already have been provided with a protective coating, either clear or colored, as described in copending applications A-5635 and A-5636. In view of the earlier application of the protective layer which would enhance the strength of the container, the clear protective layer applied at the station 114 could be thinner, since its only purpose would be label protection.

If not already provided with a colored overcoat prior to labelling, it may be desirable to add color to the coating applied at station 114 in FIG. 2. This would allow for some further coloring of the labels but would also permit the simulation of different color bottles. This would allow a container manufacturer to provide a range of colored containers on demand, while avoiding the costly down time associated with changing over from one color to another in the melting unit and the cost of raw materials and batching equipment over the basic cost of clear glass.

A further significant advantage would be that, in recycling of the bottles, it would no longer be necessary to segregate the bottles by color. The glass would all be clear flint glass and the coating would be burned off prior to or at the time of melting down of the returned bottles.

A further improvement would be the inclusion in the protective overcoat layer of a light blocking agent to hinder or prevent changes in the taste or appearance of the container contents, e.g., beer. The light blocking agent would block a suitable wavelength of light, e.g., U-V light at approximately 400 nanometers, and would be substantially clear so that it would not have a significant effect on the color of the clear coating, and would be entirely compatible with a colored coating. It would be necessary, of course, that the U-V blocking agent added to the coating material not interfere with whatever curing process was used for the coating, even if that curing process were U-V curing.

While the above description has indicated the use of vinyl or acrylic ink for printing the labels, it may be that other inks would suffice as long as they do not bleed into the overcoat material.

While the preferred embodiment of the invention has been described above, there are many alternatives which may be employed, some of which will be described hereunder.

Figure 5A:
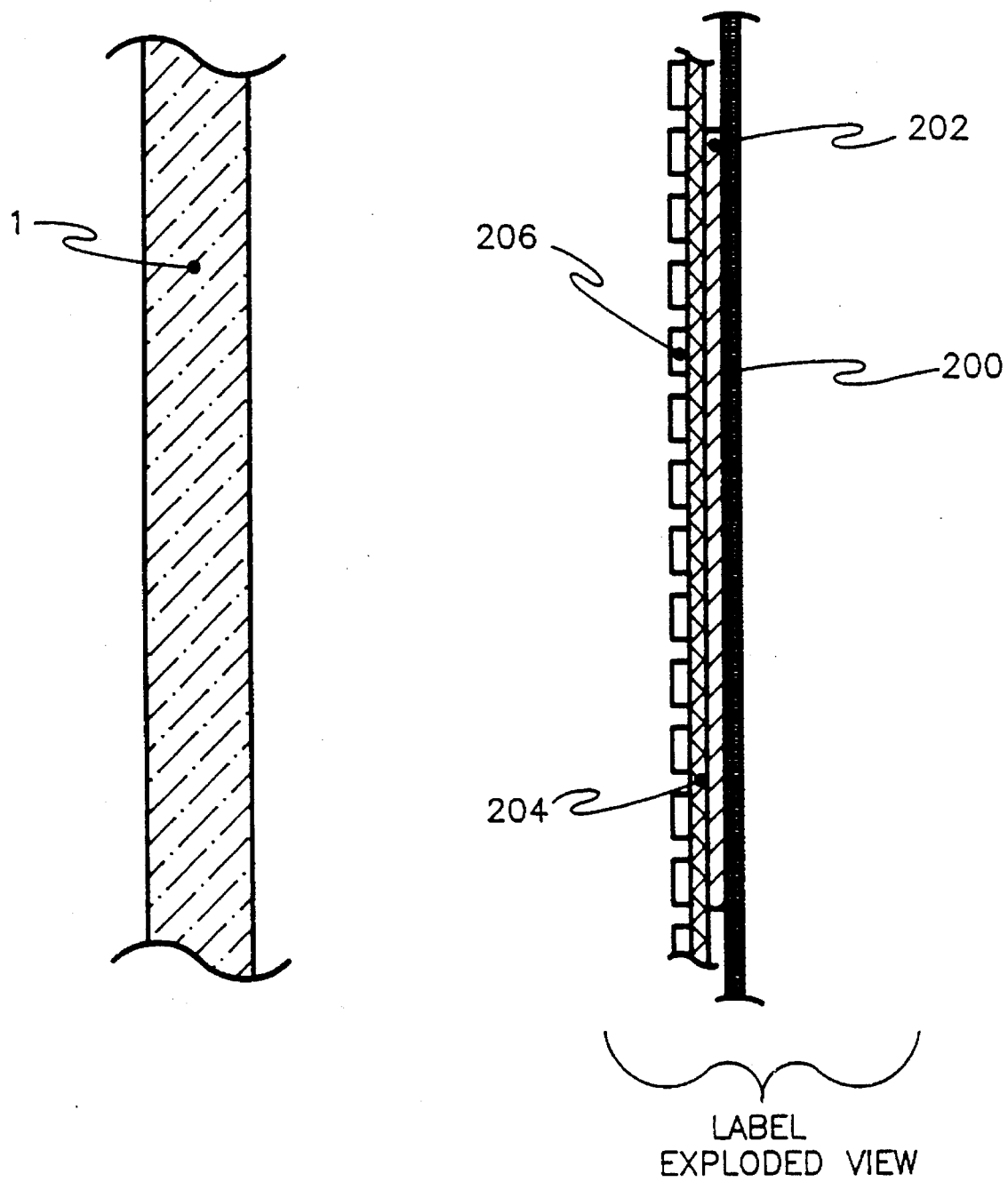
FIGS. 5A–5C illustrate various alternative label configurations according to the present invention.

A first option (FIG. 5A) is a single-film label which may be gravure printed on a polypropylene or suitable paper web 200 for subsequent heat release. If desired, as was the case in the preferred embodiment described above, a protective coating may be applied to the container after labelling, and this coating may be cured, by U-V, E-B or other energy, if desired. In FIG. 5A, this is illustrated as layer 202 which would be applied to the web 200 first, so that it will be on the exterior of the package after label application. A suitable material for the film material 202 is acrylic, and the label ink 204 is vinyl or acrylic. An adhesive 206 (e.g., comprising both of the layers 30 and 40 in FIG. 1) is applied in stripes to provide escape passages for air and moisture. The adhesive could be either (1) applied to the film at the time of printing of the single film on the web, cured and reactivated prior to application of the film to the container, or (2) applied to the printed web immediately before application of the film to the container. (It could, of course, alternatively be applied to the container.)

A second option (FIG. 5B) would be a two-layer label wherein the first layer would comprise the components 200 and 204, and optionally the protective antiabrade layer 202, as in the first option of FIG. 5A. The second layer would be a cushion layer 208 of organic material. The cushion layer could be applied (1) to the web-film laminate at the time of printing or immediately prior to application of the first film to the container, or (2) to the container itself immediately prior to application of the film to the container. The cushion layer would preferably be organic, and would be designed to release $CO_2$ micro-bubbles when energized with heat, U-V or E-B energy, either at the time of laminating or immediately prior to application to the container. Alternatively, the cushion layer may contain glass or plastic microspheres.

A third option (FIG. 5C) would be the same as the second option but the cushion layer would be a clear layer 210 applied during a single pass or multi-pass during the label printing. It would then be cured during the printing operation with U-V, E-B or other energy.

A sixth option (not shown) would be to apply a clear cushion coating after application of the label of FIG. 5A.

Figure 5B:
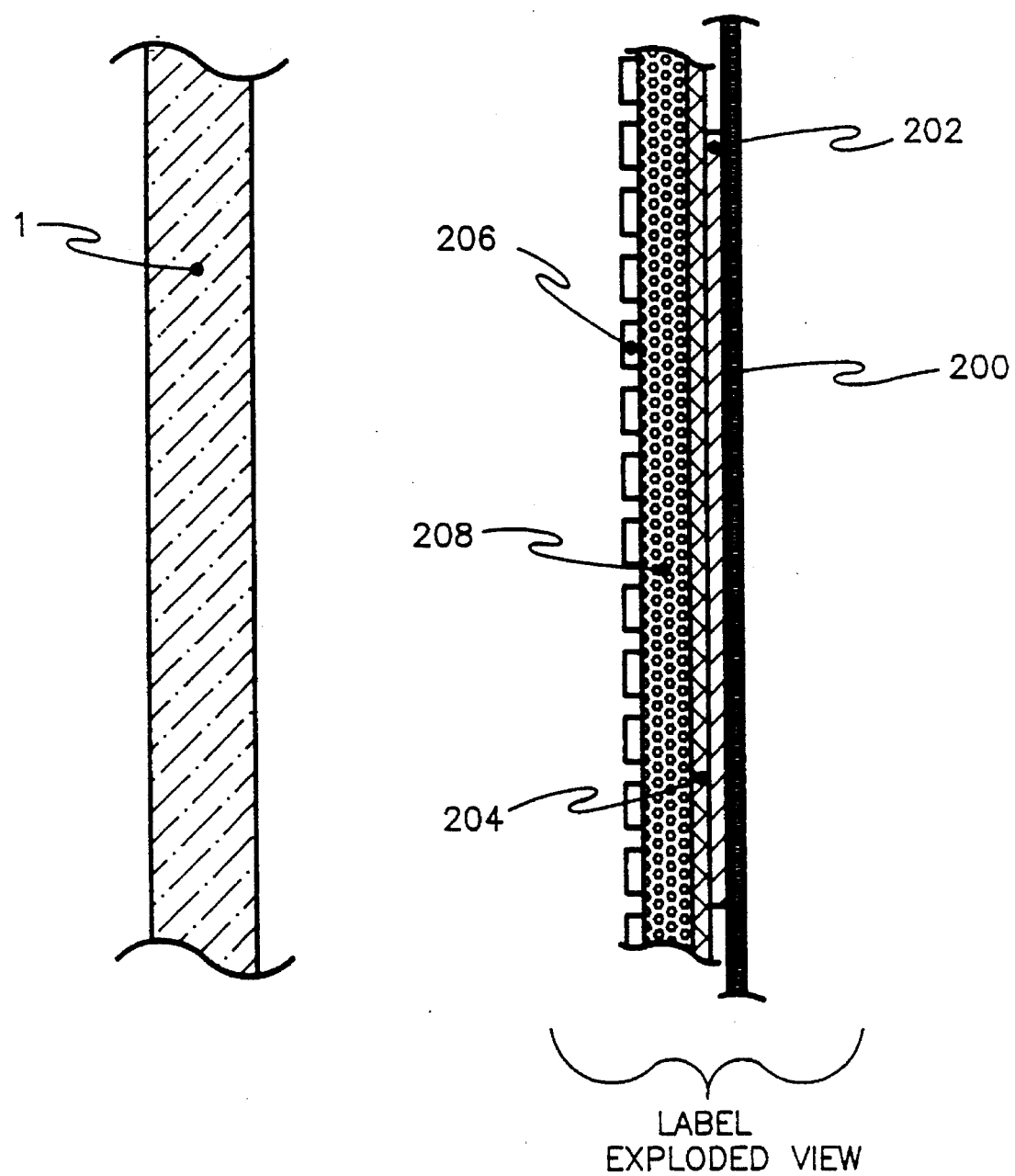
Figure 5C:
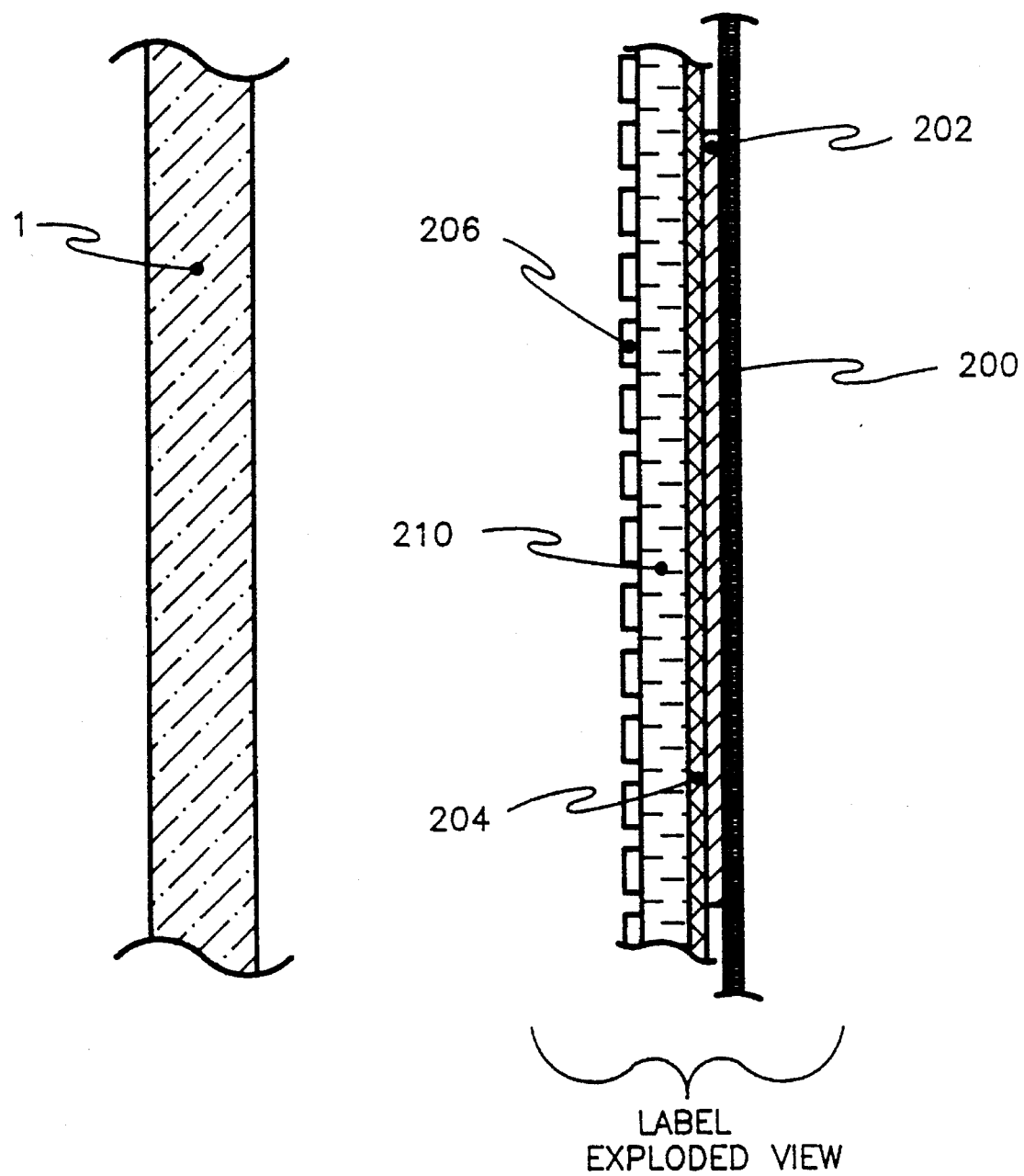

In each of FIGS. 5A–5C, there could also be a release agent on the surface of the polypropylene web 200 on the side of the bottle, i.e., between the web 200 and the remainder of the laminate, to facilitate removal of the web 200 while the label is still hot. It may in some cases be preferable not to use a release agent, in which case the web may be peeled off after cooling of the label.

A further feature of the invention is that the web, e.g., 10 in FIG. 1, may be reused after separation from the label. The used web may be taken from the take-up reel and re-laminated with whatever layer configuration is being used for labelling. This would represent a considerable cost savings. It would be necessary to modify present label printing machines to run several webs side-by-side, as opposed to the present practice of simultaneously printing plural labels on a web which is multiple labels wide and then slitting the wide web into single label-wide webs, but this may be justified by the cost savings.

It can be seen that a great number of significant advantages result from the inventions as described above. The inventions provide low-cost labelling systems which can be easily modified to meet various product requirements, and methods of applying the label in-line with the container manufacture. The systems will operate at speeds in excess of 400 containers per minute, and can handle containers of varying size and shape with simple modular changeover. They are also advantageous in that they are designed for use between the container inspection stations and final pack.

The web markings allow for accurate registry of the labels during printing and application, and the re-use of the web may result in significant cost savings. Also, the printing of the labels on a continuous web wound on reels facilitates transportation and machine loading, and the ability to connect the webs end- to-end will permit continuous labelling without interruption.

Indeed, the labelling system of this invention can be operated on demand, with nominal heat up time of the U-V or E-B cure system.

In addition to the various process advantages described above, the end product is also improved. The label is of high visual quality and is also durable, and the coated container has a high degree of impact resistance. This is especially true if microbubbles, microspheres, etc., are used to such an extent as to form an energy-absorbing network for dissipating impacts, but it is also to be noted that a high degree of impact resistance is obtained even when the outer layer is clear and the underlying label highly visible.

The label with overcoat will be able to withstand the water wash and pasteurization processes associated with non-returnable containers, and with chemical modifications to the overcoat, returnable containers will be able to survive the alkali wash required prior to refilling. Nor will the label or overcoat be adversely affected by water, alcohol or organic materials used in the filling operations.

The labels on adjacent containers will not abrade each other during the filling and packaging operations associated with transport, store display and consumer purchasing, and the labels will also be chemically and physically stable.

The coating materials can be cured in-line by U-V, E-B in a few seconds in a very energy efficient manner.

In addition to the improved label system, the present invention provides a method of overcoating a labelled glass container to provide increased impact and abrasion resistance, while maintaining high gloss and visual enhancement of the label and coated portion. The invention also provides a method of overcoating a labelled glass container to provide for :surface improvement both structurally and in appearance by filling surface flaws or microfissures with the overcoat material so as to make the flaws invisible. Such flaws may be from the glass mold itself.

Finally, the present invention provides a method of reverse printing a film, paper or other printing web of multiple inking, eliminating a costly label process at the container filling plant and at the same time giving the glass container industry a value added product. In addition, the use of a coupling agent to promote adhesion of the overcoat material to the container surface may be necessary to meet certain container processing and use requirements, specifically, but not limited to the typical beer industry pasteurization process. A suitable coupling agent is "A-1120" available from Union-Carbide Corporation.

The application of the coating may be accomplished by belt or roller coating described elsewhere, or by spraying the material. In the event the materials are sprayed it is necessary to prevent any material from contacting the finish of the container. This is the area including the opening, top seal surface, thread or closure cover area and protuberance immediately below. This can be accomplished, for example, by using a container gripper device designed to completely cover the area described above, e.g., designed with a split housing which when closed will dovetail to form a barrier to the spray material.

The gripper devices may be attached to a conveyor network whose design allows for variable spacing of the glass containers to optimize the coating, drying, and U-V curing of the various materials. The design may also provide for rotating the gripper and container at the spraying and U-V curing positions to insure uniform coating and processing.

Another feature of the invention is the use of electrostatics to compliment the protective gripper and operate in conjunction with it and described elsewhere.

It will be appreciated that further modifications could be made to the embodiment disclosed above while still obtaining many of these advantages and without departing from the spirit and scope of the invention as defined in the appended claims. For example, the heat release material 12 in FIG. 1 may be dispensed with and instead the ink printed directly on the acrylic layer 12, as is the case with the illustrations of FIGS. 5A–5C. When the label has cooled, the adhesion between the container and ink will be greater than that between the ink and acrylic layer 12, and the substrate and acrylic layer can simply be peeled off. If the heat release layer 14 of FIG. 1 is to be used, or added to the labels of FIGS. 5A–5C, it should be a material which either will not transfer to the container with the ink, or will be compatible with any subsequent overcoat if it does transfer, e.g., an acrylic material. It should also be a material which can be printed.

What is claimed is:

1. A method of applying a label to a non-porous surface of a container, comprising:

providing a container to a labelling station;

supplying to said labelling station a label laminate comprising a first layer of backing material, a second layer directly contacting said first layer, said second layer consisting of ink formed in a pattern, and heat-activated adhesive layer in registration with said pattern of said second layer;

preheating said container;

pressing said laminate against said non-porous surface of said container with said adhesive layer in contact with said container;

separating said first layer from said second layer to thereby leave said second layer over a portion of said container;

Thereafter coating at least said second layer with a protective coating material; and curing said coating material.

2. A method according to claim 1, wherein n containers are provided to said labelling station at one time, where n is an integer greater than 1, and wherein said supplying and pressing steps comprise:

contacting said laminate with each of said containers at one time;

advancing said laminate past all n of said containers simultaneously while pressing said laminate against each of said containers.

3. A method according to claim 1, wherein said ink is a vinyl ink.

4. A method according to claim 1, wherein said ink is an acrylic ink.

5. A method according to claim 1, wherein said ink is a cured ink.

6. A method according to claim 1, wherein said non-porous surface is glass.

7. A method according to claim 1, wherein said coating step comprises applying said coating material in liquid form.

8. A method according to claim 7, wherein said curing step comprises the step of applying U-V radiation to said coating material.

9. A method according to claim 7, wherein said coating material comprises a UV-curable acrylic coating.

10. A method according to claim 7, wherein said label is applied to a label region of said container, and said coating material is applied to said label region as well as a substantial portion of remaining regions of said container.

11. A method according to claim 10, wherein said container is substantially clear and said coating material is colored.

12. A method according to claim 10, wherein said container is substantially clear and said coating material is substantially clear.

13. A method according to claim 10, wherein said coating contains a U-V blocking agent.

14. A method according to claim 10, wherein said protective coating material fills in surface flaws in said container to render said surface flaws less visible.

15. A method according to claim 10 wherein said coating material is applied in different thicknesses at different regions of said container.

* * * * *